United States Patent
Nguyen et al.

(10) Patent No.: US 12,158,035 B2
(45) Date of Patent: Dec. 3, 2024

(54) PINCH SENSOR COUPLER ASSEMBLY, VEHICLE DOOR HAVING SAME AND MANUFACTURING METHOD THEREOF

(71) Applicant: Honda Motor Co., Ltd., Tokyo (JP)

(72) Inventors: Khang C. Nguyen, Raymond, OH (US); Yuichiro Saiki, Raymond, OH (US); Hiroshi Shingu, Raymond, OH (US); Makoto Hirose, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 429 days.

(21) Appl. No.: 17/586,031

(22) Filed: Jan. 27, 2022

(65) Prior Publication Data
US 2023/0235609 A1 Jul. 27, 2023

(51) Int. Cl.
*E05F 15/46* (2015.01)
*B60J 5/06* (2006.01)
*B60R 16/02* (2006.01)

(52) U.S. Cl.
CPC .......... *E05F 15/46* (2015.01); *B60R 16/0215* (2013.01); *B60J 5/06* (2013.01); *E05Y 2400/54* (2013.01); *E05Y 2400/654* (2013.01); *E05Y 2600/46* (2013.01); *E05Y 2600/626* (2013.01); *E05Y 2900/531* (2013.01)

(58) Field of Classification Search
CPC ... B60J 5/0495; B60J 5/06; B60J 5/062; B60J 5/12; B60J 5/125; B60J 5/0413; B60J 5/0416; B60R 16/0207; B60R 16/0215; E05Y 2400/54; E05Y 2400/654; E05Y 15/46; E05Y 2600/46; E05Y 2600/626

USPC ....................................................... 296/146.7
See application file for complete search history.

(56) References Cited

U.S. PATENT DOCUMENTS

| | | | | |
|---|---|---|---|---|
| 6,339,305 | B1 * | 1/2002 | Ishihara | E05F 15/44 49/27 |
| 6,494,523 | B2 | 12/2002 | Kobayashi | |
| 7,028,819 | B2 | 4/2006 | Saito et al. | |
| 7,082,720 | B2 | 8/2006 | Kobayashi et al. | |
| 7,284,785 | B2 * | 10/2007 | Gotou | H02G 3/0475 174/72 A |
| 8,191,311 | B2 | 6/2012 | Sakamaki et al. | |
| 8,312,675 | B2 | 11/2012 | Thiele | |

(Continued)

FOREIGN PATENT DOCUMENTS

| | | |
|---|---|---|
| CN | 103832334 A | 6/2014 |
| CN | 211285992 U | 8/2020 |

(Continued)

OTHER PUBLICATIONS

Computer translation of JP 4089059 (Year: 2008).*

*Primary Examiner* — Gregory A Blankenship
(74) *Attorney, Agent, or Firm* — KENEALY VAIDYA LLP (57) ABSTRACT

Some embodiments of the disclosed subject matter are directed to a vehicle door that includes a door frame and a door trim with pinch sensor located adjacent the door frame. A door harness coupler can hang within the door frame prior to assembly of the door, and can be connected to a pinch sensor coupler adjacent the door trim to electrically connect the pinch sensor to a controller and/or door actuator. Thus, the pinch sensor can be installed at the end of a door assembly line.

20 Claims, 10 Drawing Sheets

(56) References Cited

U.S. PATENT DOCUMENTS

| | | |
|---|---|---|
| 8,375,633 B2 | 2/2013 | Ikezumi et al. |
| 9,150,168 B2 | 10/2015 | Inoue et al. |
| 9,843,178 B2 | 12/2017 | Terada et al. |
| 10,038,314 B2 | 7/2018 | Satou et al. |
| 10,407,001 B2 | 9/2019 | Kogure et al. |
| 11,306,528 B2* | 4/2022 | Matsumoto ............ B60J 10/20 |
| 11,420,504 B2* | 8/2022 | Matsumoto ............ B60J 5/0411 |
| 2006/0096383 A1* | 5/2006 | Yamamoto ............ E05F 15/44 |
| | | 73/773 |
| 2007/0113481 A1* | 5/2007 | Kato ............ E05F 15/46 |
| | | 49/27 |
| 2009/0100755 A1* | 4/2009 | Ishihara ............ E05F 15/46 |
| | | 49/31 |
| 2011/0126470 A1* | 6/2011 | Higgins ............ B60R 16/0215 |
| | | 49/404 |
| 2012/0192489 A1* | 8/2012 | Pribisic ............ E05F 15/46 |
| | | 324/660 |
| 2012/0267914 A1* | 10/2012 | Thiele ............ B60J 5/06 |
| | | 296/146.9 |
| 2014/0117706 A1* | 5/2014 | Fortin ............ B60J 5/0418 |
| | | 296/146.16 |
| 2017/0005461 A1* | 1/2017 | Hartwig ............ B60R 16/0207 |
| 2018/0239045 A1 | 8/2018 | Nagao |
| 2020/0070748 A1* | 3/2020 | Kogure ............ B60R 16/0215 |
| 2020/0176960 A1* | 6/2020 | Tomosada ............ H02G 11/00 |

FOREIGN PATENT DOCUMENTS

| | | | |
|---|---|---|---|
| CN | 211869307 U | 11/2020 | |
| JP | 2007176322 A | 7/2007 | |
| JP | 4089059 B2 * | 5/2008 | ............ B60J 5/06 |
| JP | 6020208 B2 | 11/2016 | |
| JP | 2019176700 A | 10/2019 | |
| KR | 20070040221 A | 4/2007 | |

* cited by examiner

PINCH SENSOR COUPLER ASSEMBLY, VEHICLE DOOR HAVING SAME AND MANUFACTURING METHOD THEREOF

BACKGROUND

The disclosed subject matter relates to a pinch sensor coupler assembly, vehicle door having same, method of using, and manufacture method thereof. More particularly, the disclosed subject matter relates to methods and apparatus for attaching a pinch sensor assembly to a vehicle door at the end of a door manufacturing line, and a vehicle door including the pinch sensor assembly.

Many types of vehicles, such as those that travel on land, through water, by air, etc. define doors for various purposes, such as to allow ingress and egress of vehicle occupants, loading or unloading of cargo, etc. Some such vehicles include a single door, while other may include multiple doors. Exterior doors can be configured to be opened and closed so that when they are opened, an occupant can enter and exit the vehicle (or cargo can be loaded/unloaded), while when they are closed, the occupant (or cargo) is confined within the vehicle. Interior doors can be used to define discrete spaces within the vehicles, such as in the case of doors that define restrooms, vehicle operator compartments, storage compartments, etc., of trains, boats, airplanes, etc.

Many exterior and interior doors involve at least two discrete operations. For example, the doors are movable between a fully open position and a close position (or a position adjacent the closed position). The doors can also be actuated from their closed position (or adjacent the closed position) to a latched condition that, to some extent, impedes opening of the door. The latched condition can reduce impede or prevent the door from unintentionally opening under various conditions, such as during vehicle movement.

SUMMARY

Some embodiments of the presently disclosed subject matter are directed to a pinch sensor coupler assembly for a vehicle door having a door frame and a door panel. The pinch sensor coupler assembly can include a pinch sensor, a sensor coupler connected to the pinch sensor, and a door harness coupler configured to hang between the door frame and the door panel when in an unconnected state with respect to the pinch sensor coupler, and extending from a point disposed on the door frame. The door harness coupler can be configured to extend out of the door frame and connect to the sensor coupler when in a coupled state such that the door harness coupler and sensor coupler are in electrical communication with each other and such that the pinch sensor can be configured to be mounted to the door frame after electrical connection is made between the door harness coupler and sensor coupler.

Some embodiments of the presently disclosed subject matter are directed to a vehicle door. The vehicle door can include a door frame, a door trim located adjacent the door frame, and a door lining located at an outer edge of the door trim. A pinch sensor can be located adjacent the door lining and a sensor coupler can be connected to the pinch sensor. The vehicle door can further include a door harness coupler and an electrical line connected to the door harness coupler and configured to allow the door harness coupler to hang between the door trim and the door frame and to allow the door harness coupler to be removed from between the door trim and the door frame when in an unconnected state with respect to the sensor coupler. The door harness coupler and electrical line can be further configured to be located behind the door lining when the door harness coupler is in a connected state with respect to the sensor coupler. The door harness coupler and the sensor coupler can be in electrical communication with each other when in the connected state.

Some embodiments of the presently disclosed subject matter are directed to a method of assembling a door with a pinch sensor. The method can include providing a door frame having a door harness coupler hanging from an electrical wire; providing a door trim having a pinch sensor and pinch sensor coupler; moving the door harness coupler away from the door frame; connecting the door harness coupler to the pinch sensor coupler; and installing the door trim on the door frame after the connecting of the door harness coupler to the pinch sensor coupler.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Vehicles can include one or more doors. The doors can move from an open position to a closed position, or from a closed position to an open position, with or without an operator directly or physically moving the door. A vehicle door that can operate using an actuation device can be called a powered door. Operators can utilize a remote signal to actuate a vehicle's powered door. Vehicles can include sensors that can determine whether the path between a door's current position and subsequent position is obstructed. These sensors can be included as part of an assembly included in a vehicle door. Accordingly, it can be beneficial to provide a sensor assembly that facilitates simple connection to a vehicle door.

The embodiments depicted in the figures are in the context of a slide door of an automobile, and in particular a minivan. However, the disclosed subject matter is intended to be applicable to any vehicle door assembly, any type of automobile, truck, watercraft, airplane, and further applicable to both exterior and interior doors.

Embodiments depicted in the figures are in the context of a powered vehicle door that can be moved by a drive motor between a fully open position and a closed position or a position adjacent the close position, i.e., to provide powered movement longitudinally such as along an elongated track system. However, the disclosed subject matter is intended to include or otherwise cover any type of vehicle door that can utilize an actuation device to actuate between open and closed positions. Further, the disclosed subject matter can also be directed to a door that is (or is not) motor operated for the longitudinal closing action and includes a sealing action motion in which the door is brought closer to the body of the vehicle and latched in a final closing movement. It is also in this final closing movement in which a pinch sensor can be used to detect whether a user's body is located in between the door and the vehicle body even though the door is not being prevented from longitudinal movement at this time. Instead, in this example, the user's body may be pinched between the door and the vehicle body during a motion of the door that is substantially inward towards a center of the vehicle, for example.

Figure 1:
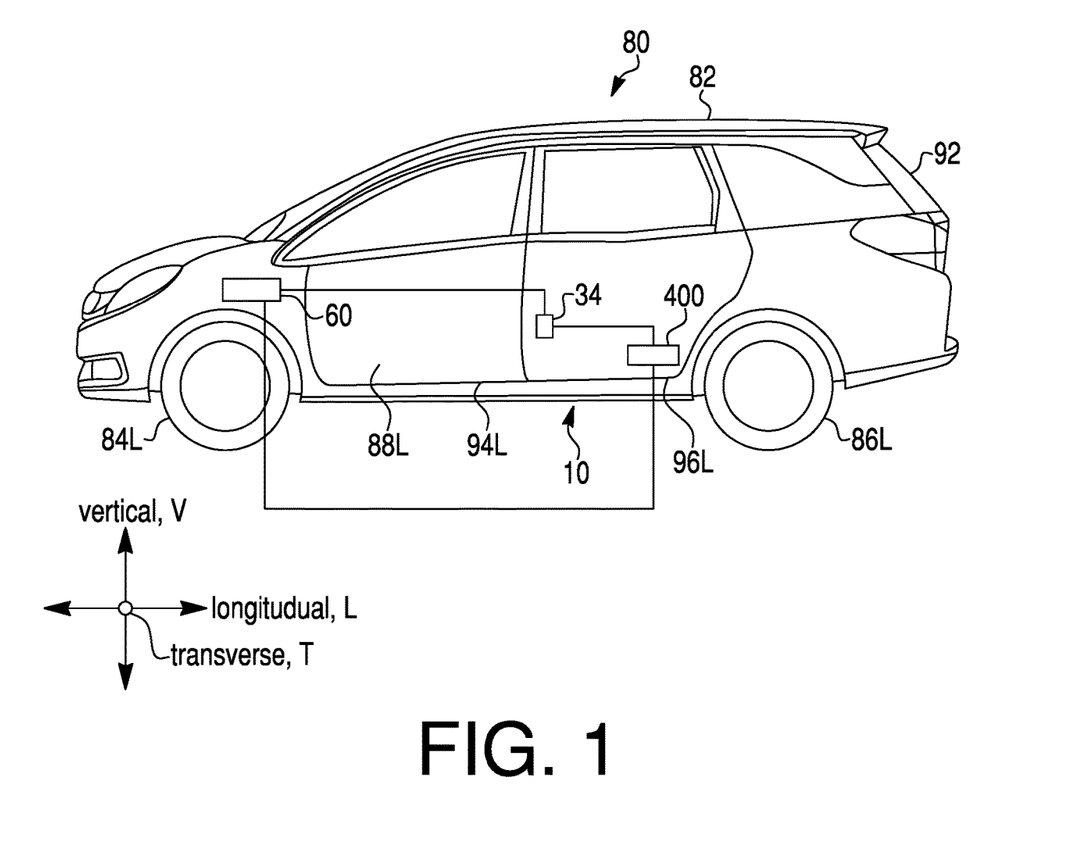
FIG. 1 is a side view of a vehicle with a vehicle door in a closed position and a schematic drawing of the electrical connection of a pinch sensor coupler assembly all made in accordance with principles of the disclosed subject matter.

FIG. 1 is a side view of a vehicle 80 with a vehicle door 10 (also referred to as a door or slide door) in a closed position and made in accordance with principles of the disclosed subject matter. The vehicle 80 shown in FIG. 1 can primarily be used on paved roadways, and can be referred to as a passenger vehicle, and in particular, a minivan. However, the vehicle door 10 can be used with any vehicle that is configured for travel along any one or combination of improved, unimproved, and unmarked roadways and paths constituted by gravel, dirt, sand, etc., as well as in water and air travel vehicles. For example, the disclosed subject matter is intended to include or otherwise cover any other type of vehicle, including passenger car, truck, van, ATV, etc. Further, the vehicle door 10 can be used in other types of vehicles, such as aircraft, boat, ship, train, spacecraft, etc. The disclosed subject matter can also be used in non-vehicular applications, such as for amusement park rides, elevators, or any other situations where occupants are disposed within an enclosed space defined by a powered door for ingress and egress.

The vehicle 80 can be described as having a longitudinal direction L, a vertical direction V, and a transverse direction T. Height can be measured in the vertical direction V.

The vehicle 80 can include a body 82, a pair of front wheels, a pair of rear wheels, a pair of front door assemblies, a pair of slide door assemblies, a back door assembly, a frame assembly, and a powertrain. The frame assembly and the powertrain are omitted from FIG. 1 for simplicity and clarity of the drawings.

Referring to FIG. 1, a left-side front wheel 84L is shown, a left-side rear wheel 86L is shown, a left-side front door assembly 88L is shown, a door 10 of a slide door assembly is shown, and a back door assembly 92 is shown. A mirror image of the left-side front wheel 84L, left-side rear wheel 86L, left-side front door assembly 88L, door 10 of a slide door assembly can be included on the opposite of the vehicle and is obstructed from view in the presently described figure.

The vehicle 80 can include a pair of front seats and a pair of rear seats mounted in a passenger area of the vehicle 80, or may only include the pair of front seats. The vehicle 80 may also include a pair of third row seats mounted in the passenger area of the vehicle 80 behind the pair of rear seats. Each pair of seats may alternatively be configured as a bench providing two, three, four, or any number of individual seating positions. The body 82 can define a pair of front door openings 94L (the right-side front door opening is obstructed from view), and a pair of rear door openings 96L (the right-side rear door opening is obstructed from view) through which a passenger may pass in order to enter or exit the vehicle 80. The body 82 can also define a back door opening (the back door opening is obstructed from view) at a rear portion of the vehicle 80.

The door assemblies can each include a door and a window panel assembly, and can be configured to selectively open and close access through the respective door openings by moving between a closed position and a fully opened position. In the closed position, the door assemblies can span the respective door openings to obstruct access to an interior of the vehicle 80 via the door openings. In the closed position, each door assembly can be latched to the body 82 of the vehicle 80. The fully opened position can be any position where the door assemblies are moved away from the respective door openings to provide substantially unobstructed access to the interior of the vehicle 80 via the door openings.

In FIG. 1, the pair of front door assemblies and the back door assembly are hingedly attached to the body 82 of the vehicle 80, and pivot between opened and closed positions. Contrarily, the pair of sliding door assemblies of the present embodiment are slideably attached to the body 82 of the vehicle 80, and slide back and forth between opened and closed positions. However, each door assembly may also be configured to be hinged, slidable, or otherwise configured to be opened and closed so as to provide access through respective door openings.

Each door assembly of the vehicle 80 can be manually operated or motorized to move between opened and closed positions within respective door openings, which is discussed in more detail below.

A schematic drawing of an exemplary circuit is included on the vehicle 80. The circuit contains the power source 60, pinch sensor 34, and vehicle door motor 400. The power source 60 of the vehicle can be in electrical communication with the pinch sensor 34 and a vehicle door motor 400 configured to actuate the door between the open and closed position.

Figure 2:
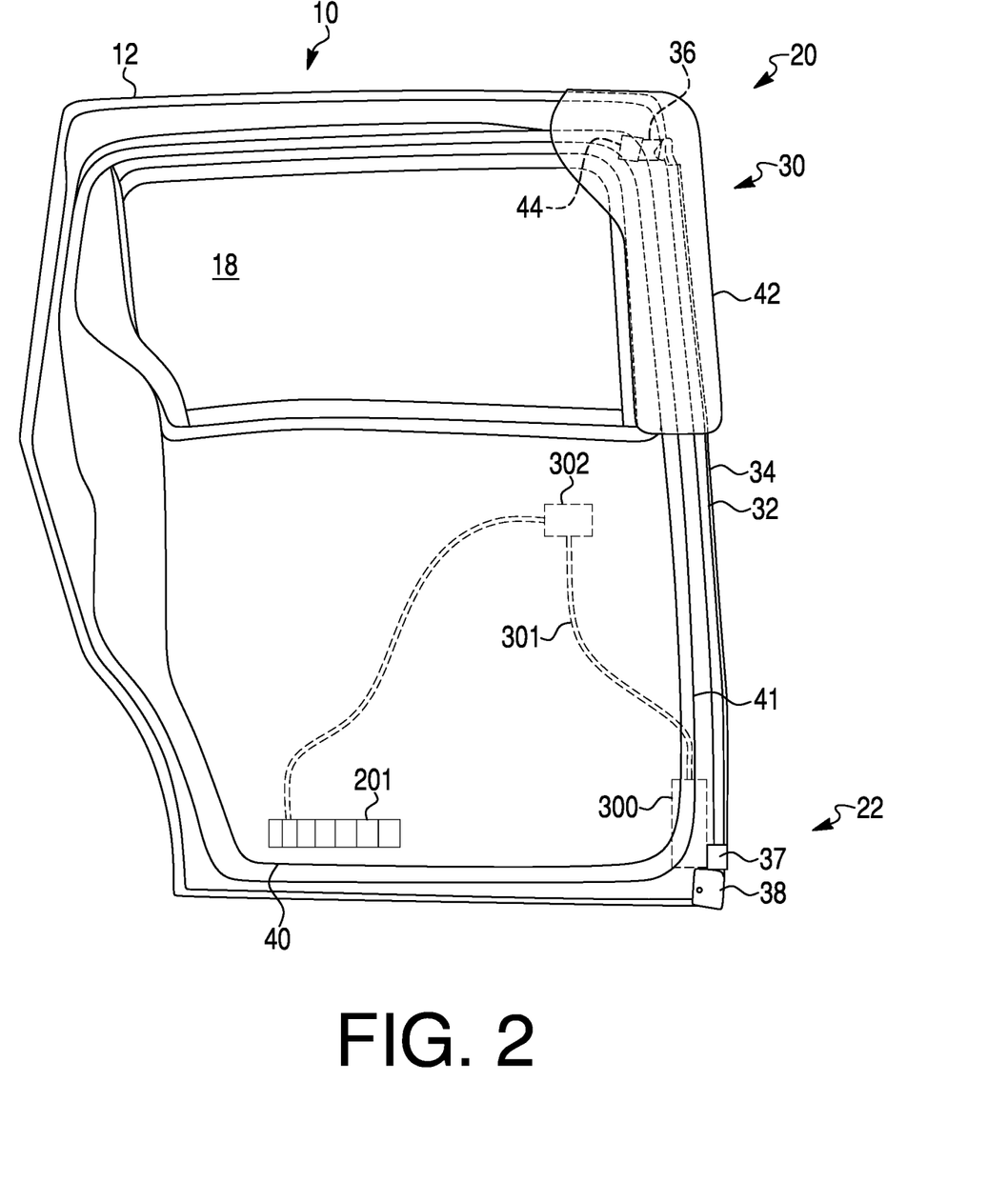
FIG. 2 is a side view of an interior of the vehicle door of FIG. 1

FIG. 2 depicts an embodiment of a vehicle door 10 made in accordance with principles of the disclosed subject matter. The vehicle door 10 can include a door frame 12, door trim 40 located adjacent the door frame 12, a door lining 41 located at an outer edge of the door trim 40, a pinch sensor 34 located adjacent the door lining 41, a sensor coupler 37 associated with the pinch sensor 34, a door harness coupler 300, and an electrical line (also referred to as wire) 301. The vehicle door 10 can further include a bracket 32 connected to the sensor coupler 37. The pinch sensor 34 can be disposed on the bracket 32 and in electrical communication with the sensor coupler 37. The bracket 32 can extend along an entire vertical length (also referred to as a length or height) of the door frame 12. The bracket 32 can secure the pinch sensor 34 along the door lining 41, and the pinch sensor 34 can be configured to connect with the door harness coupler 300 via the sensor coupler 37. The door can include an upper garnish 42 and a connector 44 to connect the upper garnish 42 to the door frame 12.

The door frame 12 (can also be referred to as a door body) can include an inner door frame panel 14 and an outer door frame panel 16, a window opening 18, an upper portion 20, and a lower portion 22. In the exemplary embodiment, the vehicle door frame 12 can be a metal structure. The inner door frame panel 14 and the outer door frame panel 16 can together form the door frame 12. The window opening 18 can be configured to receive a window assembly of the vehicle 80. The window opening 18 can be located in the upper portion 20 of the door frame 12. The door 10 can also include an attachment 24 connected to the door frame 12 and configured to attach to a minivan sliding door attachment on the body of the vehicle such that the door 10.

A pinch sensor coupler assembly 30 can be located on the door 10 and include a pinch sensor 34 that is supported by bracket 32, a sensor coupler 37 (also referred to as pinch sensor coupler or electrical connector) that is electrically connected to the pinch sensor 34, and a door harness coupler 300 (also referred to as connector) that connects via the sensor coupler 37 to the pinch sensor 34 and which ultimately connects the pinch sensor 34 to a vehicle electronic control unit via a vehicle wire harness 201. Prior to final door assembly, the harness coupler 300 can be configured to hang inside the door frame 12 in an unconnected state with respect to the pinch sensor coupler 37. In this unassembled state, the harness coupler 300 is located at an end of a wire 301 that extends from a connection point 302 disposed on the door frame 12. By contrast, FIG. 2 shows the harness coupler 300 and pinch sensor coupler 37 in an assembled and connected state after final door assembly.

In the assembled state, the bracket 32 can extend along an entire vertical length of the door frame 12. In addition, when assembled, the door trim lining 41 and pinch sensor 34 can face a B pillar or B frame of the vehicle 80 when the vehicle door 10 is in a closed position.

The pinch sensor 34 can be a capacitance type pinch sensor in electrical communication with the sensor coupler 37, harness coupler 300, and ultimately a controller 402 and/or door motor 400. The pinch sensor 34 can be a capacitance sensor configured to output a signal when a predetermined change in capacitance is measured (or detected) by the pinch sensor 34. The pinch sensor 34 can be configured to output a signal to a door motor 400 and/or controller 402 via wire 401.

The door harness coupler 300 and the sensor coupler 37 can be disposed in a lower portion of the door lining 41 when connected together. The door harness coupler 300 can be configured to extend out of the door frame 12 during assembly and connect to the sensor coupler 37 such that the door harness coupler 300 and sensor coupler 37 are in electrical communication with each other and such that the pinch sensor 34 is configured to be mounted to the door frame 12 after electrical connection is made between the door harness coupler 300 and sensor coupler 37. The door harness coupler 300 and the sensor coupler 37 can be pushed into the door frame 12 (and/or beneath the door trim 40) when the door harness coupler 300 and the sensor coupler 37 are connected together.

The door harness coupler 300 and electrical line 301 can be located behind the door trim 40 when the door harness coupler 300 is in a connected state with respect to the sensor coupler 37. The door harness coupler 300 and the sensor coupler 37 can be in electrical communication with each other when in the connected state such that the pinch sensor 34 can communicate with the controller 402 and/or motor 400. Connector 36 can be disposed at an opposing end of the bracket 32 from the sensor coupler 27. The location of the coupler 37 can vary along the length of the sensor 34 and bracket 32 depending on the application and configuration of the door 10.

The electrical line 301 can be connected to the door harness coupler 300 and can be configured to allow the door harness coupler 300 to hang between the door trim 40 and the door frame 12 (or, within the door frame 12 itself) and to allow the door harness coupler 300 to be removed from the door frame 12 when in an unconnected state with respect to the sensor coupler 37.

Referring to FIGS. 3-6, there is shown an exemplary method of assembling a vehicle door 10 with a pinch sensor 34. In accordance with operation of some of the disclosed embodiments, a door frame 12 having a door harness coupler 300 hanging from an electrical wire 301 is provided. A door trim 40 having a pinch sensor 34 and pinch sensor coupler 37 is provided. During assembly, the length of wire 301 permits the door harness coupler 300 to be moved out of and away from the door frame 12 for connection to the pinch sensor coupler 37.

Figure 3:
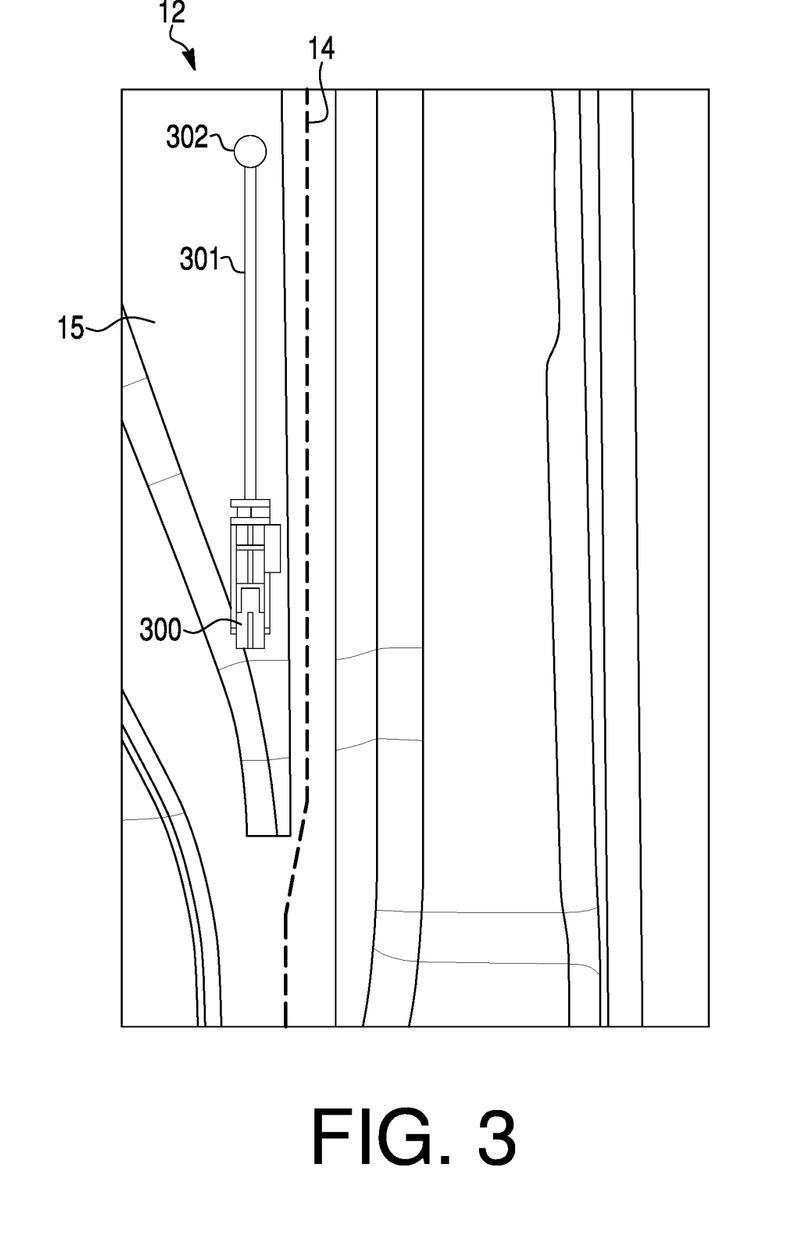
FIGS. 3-6 depict views of an edge of a vehicle door during assembly of a pinch sensor coupler assembly to a door harness coupler in accordance with principles of the disclosed subject matter.

Referring to FIG. 3, a door harness coupler 300 can hang within the door frame 12 (e.g., between the inner door frame 14 and outer door frame 16) when in an unconnected state. The door harness coupler 300 can extend via wire 301 from connection point 302 disposed on the door frame 12.

Figure 4:
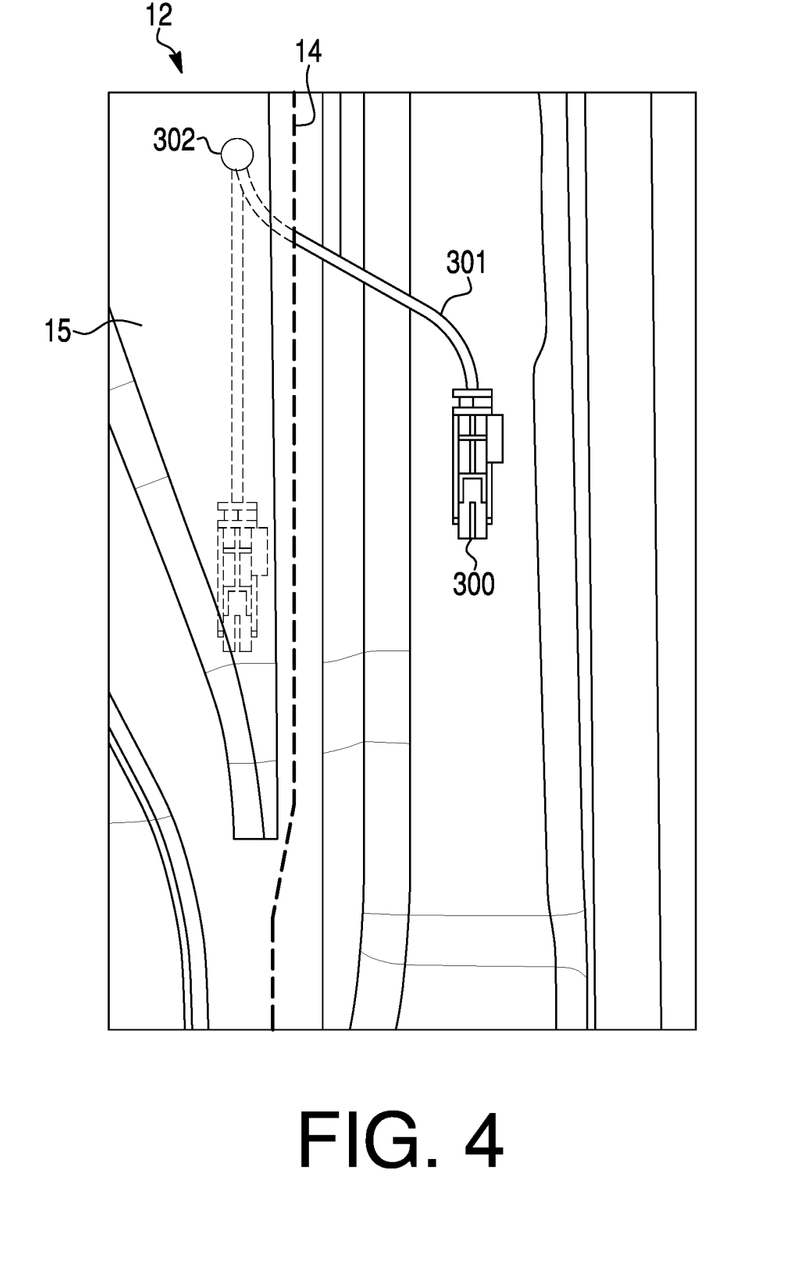

Referring to FIG. 4, the door harness coupler 300 can be pulled out away from the door frame 12 while still extending from the connection point 302 disposed on the door frame. The door harness coupler 300 can be pulled through an opening (e.g., opening 51a) located in the inner door frame panel 14 and/or side panel 15 by a user during assembly.

Figure 5:
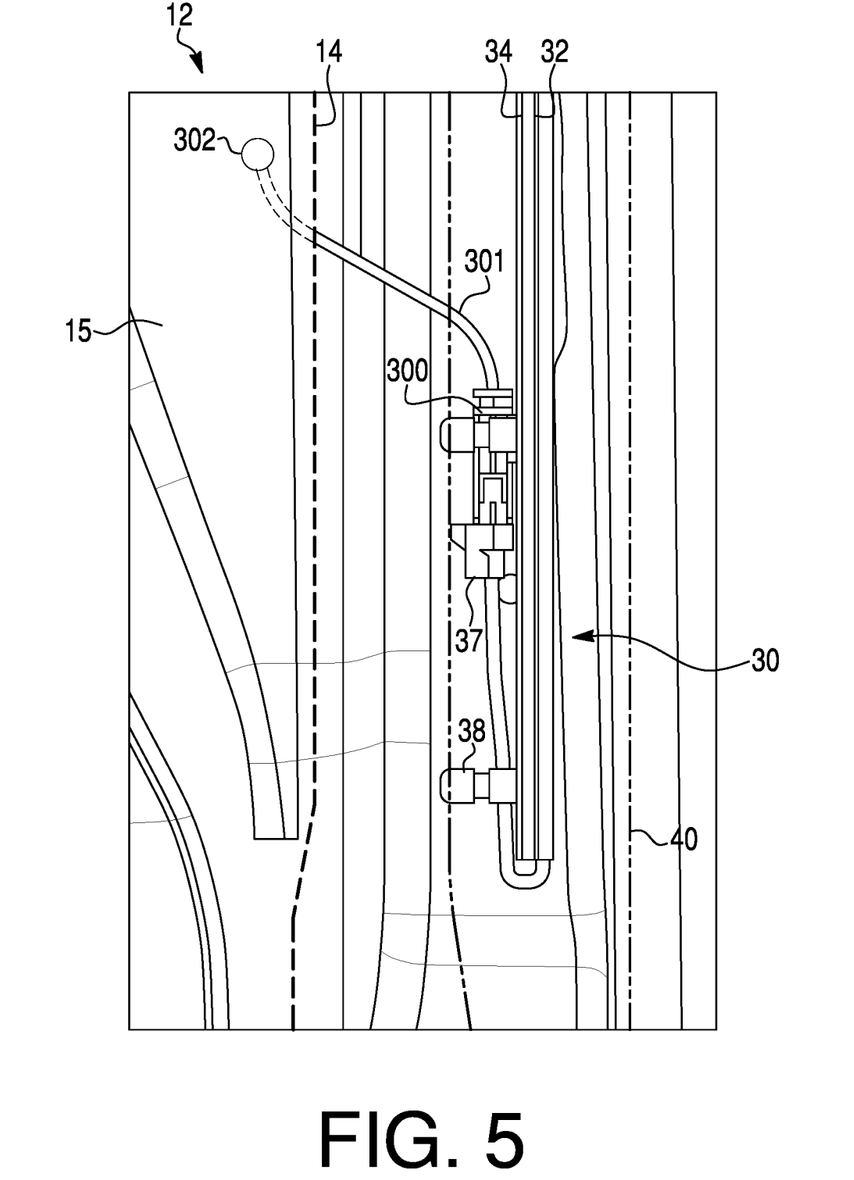

Referring to FIG. 5, after the harness coupler 300 is removed from its hanging position within the door frame 12, the door harness coupler 300 can be connected to the pinch sensor coupler 37 of the pinch sensor coupler assembly 30. The pinch sensor coupler 37 can be connected to the pinch sensor 34 disposed on the bracket 32 which can be attached to or molded to the door trim 40. Thus, it is contemplated that the door trim 40 can be moved close to the door frame 12 for connection of the harness coupler 300 to the sensor coupler 37 during assembly. Alternatively, the harness coupler 300 can be moved adjacent the door frame and coupled to the sensor coupler 37 and then the bracket 32 (and pinch sensor 34) can be connected to trim 40.

Figure 6:
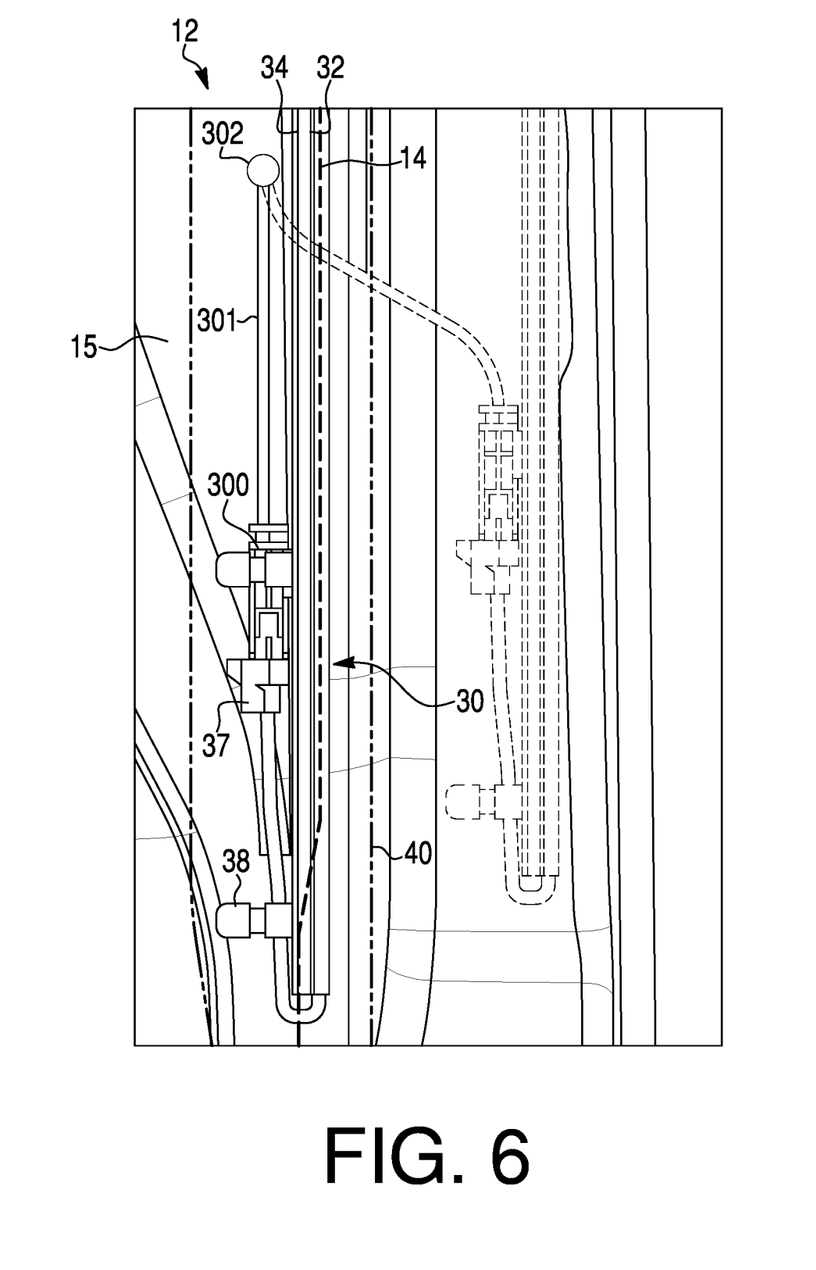

Referring to FIG. 6, the door trim 40 can be installed on the door frame 12 after the connecting of the door harness coupler 300 to the pinch sensor coupler 37 by pushing the door trim 40 into the door frame 12 until the two snap fit together, or are otherwise connected via connectors 36, 38 and any additional connectors or adhesives needed to secure the door trim 40 and the door frame 12 together. The pinch sensor 34 can be extended along an entire length of the door trim 40 such that installing the door trim 40 on the door frame 12 can include installing the pinch sensor 34 on the door frame 12 in such a manner that the pinch sensor 34 can extend along an entire vertical length of the door frame 12 and face a B-pillar of the vehicle 80 when the door 10 is installed on a vehicle 80. The door harness coupler 300 can be connected to the pinch sensor coupler 37 and installed on the door trim 40 on the door frame 12 at an end of a door assembly line.

Figure 7:
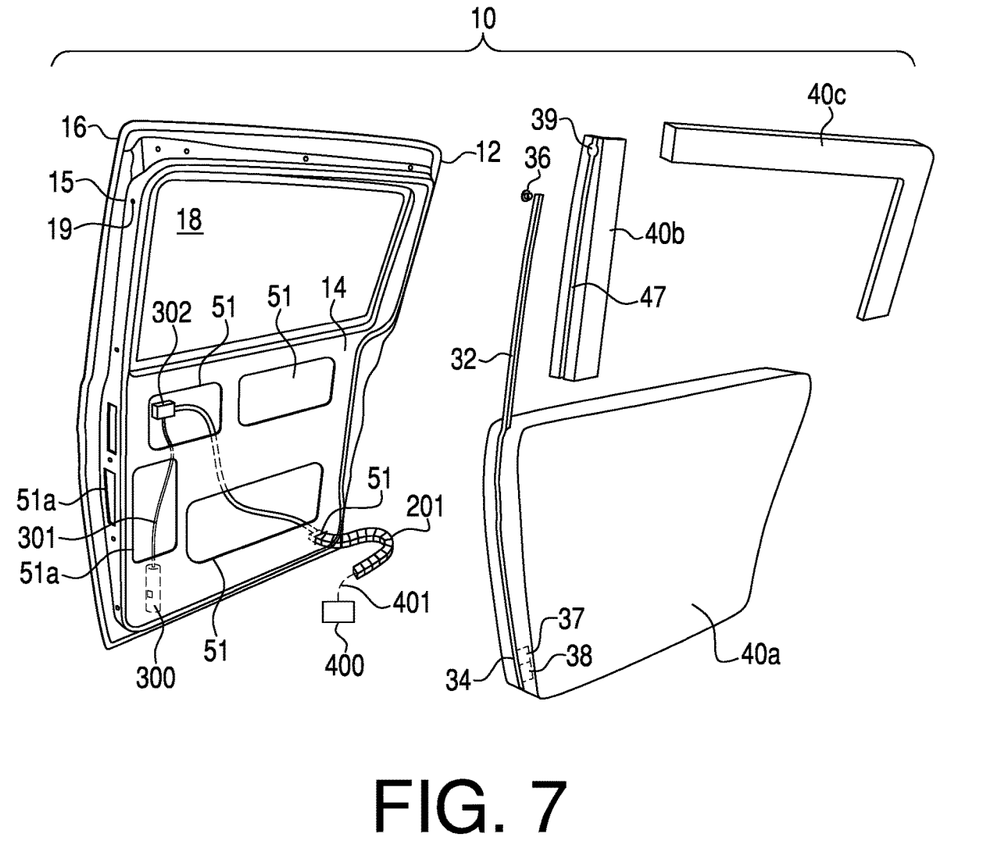
FIG. 7 is a perspective view of another embodiment of a vehicle door made in accordance with principles of the disclosed subject matter.

FIG. 7 depicts another embodiment of a door 10 made in accordance with principles of the disclosed subject matter in which the door 10 includes a door frame 12 that has an inner door frame panel 14 and an outer door frame panel 16. A side panel 15 can be located around a periphery of the door and serves to space the inner door frame panel 14 from the outer door frame panel 16. The door frame 12 and panels 14-16 can be made from metal and welded together. In addition, several openings 51 can be located in each of the panels 14-16 in order to decrease the weight of the door, to decrease cost of the door, and to allow for installation of window components, door motor components, door lock and latch components, wire harness components, etc. In particular, a door wire harness 201 can extend from a small opening 51 in the door 10 for attachment to a main vehicle wire harness 401. The door wire harness 201 can include wiring for carrying signals and/or electrical power to the window, locks, pinch sensor 32 and other electronic components located in the door 10. Another opening or openings 51a can be located in the inner door frame panel 14 and/or side panel 15. Opening 51a permits a connector 300 attached to a wire 301 to swing out of the door frame 12 and be connected to the electrical connector 37 associated with the pinch sensor 34. The wire 301 can be hung from a connection point 302 located within the door 10 such that enough length of wire 301 is permitted to hang downward prior to assembly of the pinch sensor coupler assembly 30 to the door 10. Thus, during assembly, a user can reach within an opening 51/51a located on the inner door frame panel 14 and/or side panel 15, grasp the connector 300 and remove it (e.g., swing it) from inside of the door frame 12 to a location outside of the door frame 12 and then connect the connector 300 to the electrical connector 37 of the pinch sensor coupler assembly 30. After connection, the pinch sensor coupler assembly 30 and associated door trim to which the pinch sensor coupler assembly 30 is attached or mounted can be assembled to the door frame 12 via connectors 36, 38 (and as many other connectors or adhesives necessary to secure the trim 40a and bracket 32 to the door).

The connection point 302 can be a hook or snap or other structure that can retain the wire 301 in a hung orientation for assembly. Further, the connection point 302 can be a separate plastic structure attached to the frame 12 or can be a portion of the frame 12 itself that is formed to be a connection structure 302 that allows the wire 301 and connector 300 to be conveniently located and moveable for connection to the pinch assembly 30 during, for example, a final step of the door assembly.

The trim 40 for finishing the interior of the door 10 in this embodiment can include three pieces: a lower trim panel 40a to be located below the window opening 18 of the door 10, an upper forward trim panel 40b to be located adjacent a side of the window opening 18 of the door 10, and an upper rearward window surround panel 40c to be located adjacent an upper and rearward portion of the window opening 18. The bracket 32 and pinch sensor 34 can be molded or otherwise attached to the lower door trim panel 40a. In this embodiment, the bracket 32 and sensor 34 extend above the lower trim panel 40a and can be attached to the forward trim panel 40b before or after assembly to the door frame 12. A channel 47 can be located on a face of the trim 40b for the bracket 32 to be attached such that the pinch sensor 34 faces outwards from the trim panel 40b when assembled to the door frame 12.

In the embodiment depicted, the bracket 32 and pinch sensor 34 run along a center line of a face of the panels 40a, 40b extending an entire length from the base to the top of the door frame 12 when assembled, such that the pinch sensor 34 faces a B-frame of the vehicle when assembled. Alternatively, both the trim panels 40a and 40b can have the bracket 32 and/or pinch sensor 34 attachable to or molded into a lateral edge of the panels 40a, 40b, while also extending an entire length from the base to the top of the door frame 12 when assembled. The location and placement of the pinch sensor 34 on the panels 40a, 40b can be determined based on the particular application and/or geometry of the vehicle to ensure appropriate actuation of the pinch sensor 34.

An opening 39 can be placed in the trim 40b to allow connector 36 to extend therethrough and attach to the door frame 12 via a mating connector structure 19 located at a top of the door frame 12.

Figure 8:
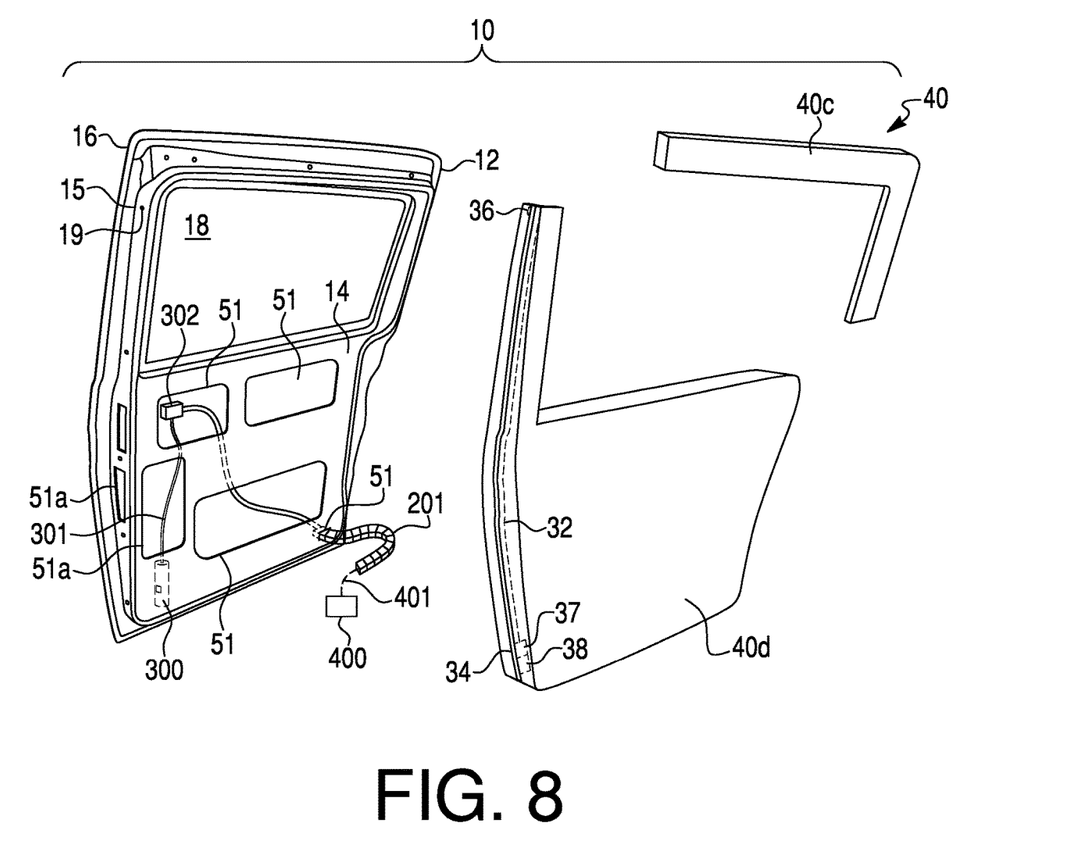
FIG. 8 is a perspective view of another embodiment of a vehicle door made in accordance with principles of the disclosed subject matter.

In FIG. 8 the trim is shown in two separate pieces: a lower trim panel 40d to be located below the window opening 18 of the door 10 and along a leading edge of the door 10, and an upper rearward trim panel 40c to be located adjacent a top and a rearward side of the window opening 18 of the door 10. The bracket 32 and pinch sensor 34 can be molded, snap fit, or otherwise attached into the lining of the door trim panel 40d. In this embodiment, during assembly, the connector 300 can be attached to the electrical connector 37 for the pinch sensor 34 and, subsequently, the panel 40d can be snap fit (or otherwise attached) onto the door frame 12. The specific location of the pinch sensor 34 and/or bracket 32 can vary, and can be centered or along a lateral edge of front facing portion of the panel 40d depending on application, geometry of vehicle, etc. The leading edge of the trim panel 40d extends from a lowermost point of the front edge of the door 10 in a vertical direction to an uppermost point of the front edge of the door 10. Thus, the pinch sensor 34 can run along an entire vertical length of the door trim panel 40d as well as an entire vertical length of the door frame 12.

Figure 9:
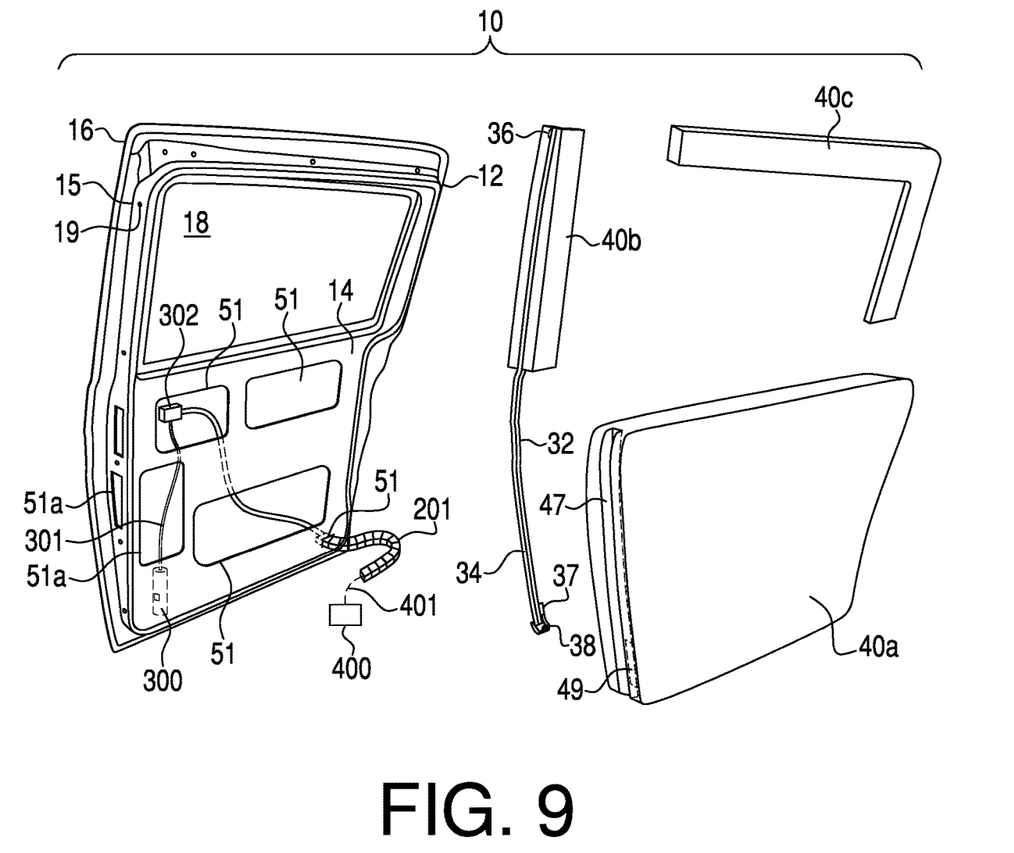
FIG. 9 is a perspective view of another embodiment of a vehicle door made in accordance with principles of the disclosed subject matter.

In FIG. 9 the trim 40 is shown in three separate pieces: a lower trim panel 40a to be located below the window opening 18 of the door 10, an upper forward trim panel 40b to be located adjacent a side of the window opening 18 of the door 10, and an upper rearward window surround panel 40c to be located adjacent an upper and rearward portion of the window opening 18. The bracket 32 and pinch sensor 34 can be molded or otherwise attached to the upper forward door trim panel 40b. In this embodiment, the bracket 32 and sensor 34 extend from the lower edge of the panel 40b and can be snap fit (or otherwise attached) to the trim panel 40a. For example, the bracket 32 and pinch sensor 34 can be molded directly into the upper forward trim panel 40b and then snap fit into lower trim panel 40a before or after the connector 37 hanging from the upper trim panel 40b is attached to the wiring harness connector 300.

Figure 10:
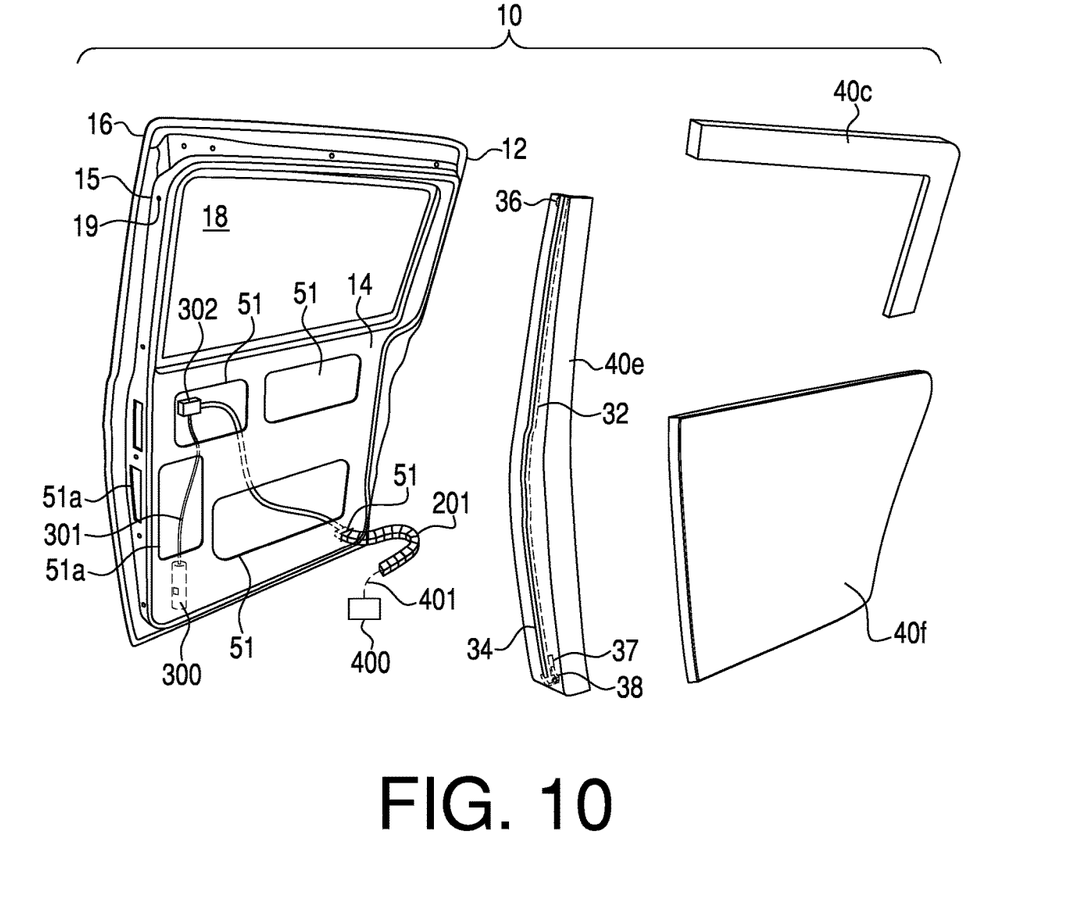
FIG. 10 is a perspective view of another embodiment of a vehicle door made in accordance with principles of the disclosed subject matter.

In FIG. 10 the trim 40 can include a liner panel 40e and bracket 32 and pinch sensor 34 molded (or otherwise attached) to the liner panel 40e that finishes the leading edge of the door frame 12 when installed. The trim 40 is shown in three separate pieces: a liner panel 40e to be located in front of the window opening 18 of the door 10 and along an entire vertical length (height) of the leading edge of the door 10, an upper rearward trim panel 40c to be located adjacent a rear and upper side of the window opening 18 of the door 10, and an lower rearward panel 40f to be located adjacent and rearward of the liner panel 40e below the window opening 18. The bracket 32 and pinch sensor 34 can be molded or otherwise attached to the liner trim panel 40e. In this embodiment, during assembly, the connector 300 can be attached to the electrical connector 37 for the pinch sensor 34 and, subsequently, the liner panel 40e can then be snap fit (or otherwise attached) onto the door frame 12. The specific location of the pinch sensor 34 and/or bracket 32 can vary, and can be centered or along a lateral edge of front facing portion of the panel 40e depending on application, geometry of vehicle, etc., for all embodiments disclosed herein. When assembled, the leading edge of the trim panel 40e extends from a lowermost point of the front edge of the door 10 in a vertical direction to an uppermost point of the front edge of the door 10. Thus, the pinch sensor 34 can run along an entire vertical length of the door trim panel 40e as well as an entire vertical length of the door frame 12. During assembly, the connector 300 can be pulled out of the door frame 12 via an opening 51a and connected to connector 37 located on the panel 40e and connected to pinch sensor 34. The panel 40e can then be attached to the door frame 12 via connectors, adhesive, welds, or other means. It should be understood that the different locations, attachment methods and structures, method steps and sequences from any of the disclosed embodiments can be used in any of the other embodiments.

As noted above, the door panels 14-16 can be each welded together. However, it is also contemplated that the door panels 14-16 can be attached or formed together using various other known methods and structures, such as adhesives, bolts, rivets, clamps, solder, brazing, etc. The door panels 14-16 can also be made of other materials, such as metal compounds, plastics, ceramics, or other composite materials. The wire 301 is shown as hanging from a connection point 302 to a point above a floor of the door frame 12. However, the wire 301 can extend all the way to the bottom of the door 10 and rest within the frame 12 of the door on a lowermost floor surface such that the length if the wire 301 allows it to extend a substantial distance away from the door frame 12 for connection to the pinch sensor coupler assembly 30 during assembly. Thus, the user has more options for locating the pinch sensor coupler assembly 30 relative to the door frame 12 during assembly.

Each of the panels 40a-40f can be differently shaped depending on the application and vehicle type, and are merely exemplary. It is contemplated that instead of multiple panels (e.g., panels 40a-c), a single panel that includes a pinch sensor coupler assembly 30 located in a leading edge could be used to finish the door frame. The sensor connector 37 and door harness connector 300 can be male and female type electrical connectors, respectively, but can also be formed in various other known manners for electrical connectors, such as magnetic connectors, nut and bolt type connectors, welded connections, soldered connections, etc. In addition, the connector 37 can be configured to hang via a wire from the bracket 32 and pinch sensor 34 such that during assembly, the connector 37 is fed into the door frame 12 and connected to connector 300 that may be fixed to the door frame 12 or otherwise located within a window in the door frame 12.

Alternative Embodiments

While certain embodiments of the invention are described above, it should be understood that the invention can be embodied and configured in many different ways without departing from the spirit and scope of the invention.

As disclosed above, embodiments are intended to be used with any type of vehicle. The power source for the vehicle 80 can be an internal combustion engine, an electric motor or a hybrid of an internal combustion engine and an electric motor. The power source configured as an internal combustion engine or a hybrid power source can have the engine output axis oriented in the longitudinal direction L or in the traverse direction T of the vehicle. The engine can be mounted forward of the front axles, rearward of the rear axles, or intermediate the front and rear axles. A separate power source or motor 400 can be provided to move the door to the sealed position as described above. Alternatively, power can be drawn from the main power source 60 for the vehicle 80. In addition, two or more power sources 60 can be used for closing the door: a first power source for longitudinal motion, and a second power source for sealing motion in a transverse direction. A linkage can also be used instead of the second power source to cause the sealing motion for the door 10. In addition, the motor 400 can be located on the door frame 12 or can be mounted on the vehicle frame depending on application and vehicle geometry.

Electrical communication lines 401 can connect a controller to the engine, power sources, the transmission and any sensors, including the pinch sensor 34, in any appropriate manner. Electrical communication can be either one-way communication or two-way communication and can be networked or not networked. The controller 402 also can be referred to as an electronic control unit (ECU) or as a central processing unit. The controller 402 can be built into the motor 400, sensor 34, or can be a separate stand-alone controller or can be a part of the main ECU for the vehicle. The sensors can be configured with hardware, with or without software, to perform the assigned task(s). The sensors can be configured as a smart sensor such that the sensors can process the raw data collected by the sensors prior to transmission to the ECU or the sensors can be configured as a simple sensor that passes the raw data directly to the ECU without any manipulation of the raw data. The sensors can be configured to send data to the ECU, with or without a prompt from the ECU, or to send data to any other controller (such as a door motor controller) for processing or acting thereupon.

In exemplary embodiments the signal output by the pinch sensor 34 can go to the vehicle ECU. Alternatively, the signal can go directly to an actuator controlling the powered vehicle door.

The door can also be referred to as powered door, sliding door, minivan door, second door, middle door, powered vehicle door.

The connection point 302 from which the door harness coupler 300 extends from can be disposed at any point on the door frame 12.

In exemplary embodiments, the door trim can be made from any material known in the art for interior vehicle panels. Examples of door trim materials include, but are not limited to, plastic, wood, carbon fiber, metal, combinations of any of these materials, faux-carbon fiber, faux-wood, polymers, and reinforced padded materials.

In exemplary embodiments, the upper garnish can be made from any material known in the art for interior vehicle panels. Examples of upper garnish materials include, but are not limited to, plastic, wood, carbon fiber, metal, combinations of any of these materials, faux-carbon fiber, faux-wood, polymers, and reinforced padded materials.

In exemplary embodiments, the bracket can be made from any material known to one of ordinary skill in the art for vehicle door pinch sensors. The bracket material can be, but is not limited to, plastic, rubber, composite, polymer, metal, or any combination of these materials.

In exemplary embodiments the bracket can be elastically deformable, rigid, or can retain its shape after force has been removed. Bracket height is not limited to the door height. The bracket can be longer, shorter, or extend around the entire outer periphery of the door. Basically, the bracket 32 and/or pinch sensor 34 can be configured to be located anywhere a pinch point is observed on a vehicle, whether only at a leading edge of the door 10 or around a periphery of the door 10 or at discrete locations on the door. Further, multiple pinch sensors 34 can be located in parallel about the trim. For example, two pinch sensors 34 can extend in parallel along an entire length (height) of the door 10 leading edge such that a first pinch sensor 34 protects a pinch line located at an exterior leading edge of the door 10 that faces the B-pillar when the door is closed, and a second pinch sensor 34 protects a pinch line located at an interior leading edge of the door 10 that faces the B-pillar when the door is closed.

The bracket 32 can include portions that contain the sensor, or the sensor can extend the entire length of the bracket. The sensor can be disposed on an outer surface of the bracket, or the sensor can be located within the bracket.

In the disclosed embodiments, connection and/or attachment of any of the door trim, upper garnish, unitary panel, bracket, and pinch sensor coupler assembly can use any known form of connection known to one of ordinary skill in the art. Examples include, but are not limited to, screws, fasteners, clips, molding, adhesives, bolts, pins, elastically deformable mating pieces, male and female connectors, locking protrusions, welding, and locking mechanisms.

As disclosed above, embodiments are intended to include the bracket snap fitting into the door trim. Snap fit connectors can be used and can be separate pieces from the bracket and the door trim or one snap fit connector can be an integral part of the door trim and a second snap fit connector can be an integral part of the bracket or any combination thereof. Snap fitting can refer to a connection mechanism wherein two pieces are joined together, or connected, by applying pressure as one piece enters another. As pressure is applied, the connection portions of the respective pieces will elastically deform until they are joined. Once joined successfully, the connection portions will return to their original shape and will be mated. However, one of ordinary skill in the art will recognize other snap fit mechanisms that are possible.

The door trim and bracket may be snap fit using a push pin piece to join the bracket into the door trim. Any connection mechanism that utilizes pushing together two structures together until they are locked together can be used as a snap fit mechanism for the presently disclosed subject matter. Additionally, any other connection known in the art can be used to connect the door trim and the bracket.

The bracket can extend along the entire length of any of the following: the door, the door frame, the door body, the upper portion and/or lower portion of the door frame. The bracket can extend along any of these listed structures in the vertical direction of the vehicle, the longitudinal direction of the vehicle, the depth direction of the door and any combination of these directions. The depth direction of the door can be orthogonal to the vertical direction and the longitudinal direction when the door is attached to the vehicle and in a closed position. For example, the bracket can extend around the entire periphery of the door spanning both the vertical direction and the longitudinal direction.

In exemplary embodiments, the length of the door refers to portion of the door that extends in the vertical direction of the vehicle. Alternate embodiments contemplate lengths in other dimensions of the door such as, but not limited to, the width of the door (also referred to as the length of the door in a longitudinal direction of the vehicle), the depth or thickness direction of the door, and lengths spanning multiple directions such as around a perimeter or outer periphery of the door that spans both a vertical direction and a longitudinal direction that can otherwise be referred to as a circumferential length of the door. The length of the door can also refer to the length of the door frame and the length of both the door and the door frame can be measured as the same length.

In exemplary embodiments, the bracket (and/or pinch sensor) can be disposed anywhere on the vehicle door known in the art for positioning a pinch sensor. For example, in a depth direction of the door, the bracket can be located on a leading edge of an inner door panel of the door frame. In other embodiments, the bracket (and/or pinch sensor) can be located on a leading edge of an outer panel of the door frame. Additionally, the bracket (and/or pinch sensor) can be located at any point in the depth direction of the door and the vertical direction along the door frame of the door in between the inner door frame panel 14 and the outer door frame panel 16 such that the bracket 32 is configured to contact an object, as the door slidably moves between the open position and closed position, before the object obstructs an opening in the vehicle between the frame assembly and the door 10.

The pinch sensor 34 and bracket 32 can be pre-assembled with the door panel or trim 40. Thus, the pinch sensor 34 can be installed at an end of the door assembly line (e.g., when door trim is attached to the door to finalize assembly of the door 10). Thus, it is not necessary to separately fit the sensor 34 directly onto a leading edge of the door frame 12. Instead, the sensor 34 can be attached to the door with the final trim attachment steps or process.

Exemplary embodiments are also intended to cover different types of connectors and/or attachment points for the pinch sensor coupler assembly. The connectors for attaching the pinch sensor coupler assembly to the door panel can be located anywhere along bracket and/or door panel. For example, the bracket 32 can be molded or attached directly on to the door frame instead of the door trim. In exemplary embodiments, the bracket 32 can be attached at multiple points on the door and is not limited to the door trim 40.

Exemplary embodiments are intended to cover all software or computer programs capable of enabling processors to implement the above pinch sensor coupler assembly. Exemplary embodiments are further intended to cover such software, computer programs, systems and/or processes provided through any other currently known, related art, or later developed medium (such as transitory mediums, carrier waves, etc.), usable with the exemplary operations disclosed above.

What is claimed is:

1. A pinch sensor coupler assembly for a vehicle door having a door frame, a door panel, and a connection point on the door panel and inside of the door frame, the assembly comprising:
   a pinch sensor;
   a sensor coupler connected to the pinch sensor; and
   a door harness coupler configured to hang from the connection point when in an unconnected state with respect to the sensor coupler, and extending from a point disposed on the door frame, wherein
   the door harness coupler is configured to extend from the connection point and out of the door frame and connect to the sensor coupler when in a coupled state such that the door harness coupler and sensor coupler are in electrical communication with each other and such that the pinch sensor is configured to be mounted to the door frame after electrical connection is made between the door harness coupler and sensor coupler.

2. The pinch sensor coupler assembly according to claim 1, wherein
the pinch sensor is a capacitance type pinch sensor in electrical communication with the sensor coupler.

3. The pinch sensor coupler assembly according to claim 1, further comprising:
a bracket upon which the pinch sensor is mounted, the bracket configured to extend along an entire vertical length of the door panel.

4. The pinch sensor coupler assembly according to claim 3, further comprising:
a door trim lining, wherein the bracket is mounted on the door trim lining, and the door trim lining and pinch sensor face a B pillar of the vehicle when the vehicle door is in a closed position.

5. The pinch sensor coupler assembly according to claim 3, wherein
the door harness coupler and the sensor coupler are configured to be pushed into the door panel when the door harness coupler and the sensor coupler are connected together.

6. The pinch sensor coupler assembly according to claim 3, wherein
the pinch sensor is a capacitance sensor.

7. The pinch sensor coupler assembly according to claim 6, wherein
the pinch sensor is configured to output a signal when a predetermined change in capacitance is measured by the pinch sensor.

8. The pinch sensor coupler assembly according to claim 1, wherein
the pinch sensor is configured to output a signal to a door actuator.

9. The pinch sensor coupler assembly according to claim 1, wherein
the door panel includes an inner panel and a lining panel assembly, the lining panel assembly including an inner edge adjacent the inner panel and extending in a vertical direction and an outer edge spaced from the inner panel and also extending in the vertical direction, and the pinch sensor extends along an entire length of the lining panel assembly in the vertical direction and is located between the inner edge and outer edge of the lining panel assembly.

10. A vehicle door, comprising:
a door frame;
a door trim located adjacent the door frame;
a pinch sensor located adjacent the door trim;
a sensor coupler connected to the pinch sensor;
a door harness coupler;
a connection point inside of the door frame; and
an electrical line connected to the door harness coupler and configured to allow the door harness coupler to hang in the door frame from the connection point and to allow the door harness coupler to be removed from the door frame when in an unconnected state with respect to the sensor coupler, and the door harness coupler and electrical line further configured to be located adjacent the door frame and hidden by the door trim when the door harness coupler is in a connected state with respect to the sensor coupler, wherein
the door harness coupler and the sensor coupler are in electrical communication with each other when in the connected state.

11. The vehicle door of claim 10, wherein
the door trim includes a bracket located adjacent thereto; and
the door harness coupler and the sensor coupler are configured such that when they are in a final connected state, the door harness coupler and the sensor coupler are in electrical communication with each other, and are connected to the bracket adjacent the door trim.

12. The vehicle door of claim 11, wherein
the door harness coupler and the sensor coupler are disposed in a lower portion of the door trim.

13. The vehicle door of claim 11, wherein
the door trim is configured to face a B pillar of a vehicle in which the vehicle door is installed.

14. The vehicle door of claim 10, further comprising:
a bracket connected to the sensor coupler, wherein
the pinch sensor is disposed on the bracket and in electrical communication with the sensor coupler.

15. The vehicle door of claim 14, wherein
the pinch sensor is a capacitance sensor.

16. The vehicle door of claim 15, wherein
the pinch sensor is configured to output a signal when the sensor detects a predetermined change in capacitance.

17. The vehicle door of claim 14, wherein
the bracket extends along an entire vertical length of the door frame and is configured to connect into the door trim with the door harness coupler and the sensor coupler.

18. A method of assembling a door with a pinch sensor, the method comprising:
providing a door frame having a door harness coupler hanging from an electrical wire;
providing a door trim having a pinch sensor and pinch sensor coupler;
moving the door harness coupler away from the door frame;
connecting the door harness coupler to the pinch sensor coupler;
installing the door trim on the door frame after the connecting of the door harness coupler to the pinch sensor coupler.

19. The method of assembling a door with a pinch sensor of claim 18, wherein the pinch sensor extends along an entire length of the door trim such that installing the door trim on the door frame includes installing the pinch sensor on the door frame in such a manner that the pinch sensor extends along an entire vertical length of the door frame and faces a B-pillar of the vehicle when the door is installed on a vehicle.

20. The method of assembling a door with a pinch sensor of claim 18, wherein connecting the door harness coupler to the pinch sensor coupler and installing the door trim on the door frame occurs at an end of a door assembly line.

* * * * *